United States Patent [19]

Rudin

[11] Patent Number: 4,969,955
[45] Date of Patent: Nov. 13, 1990

[54] COATED PREGELATINIZED STARCH AND PROCESS FOR PRODUCING SAME

[75] Inventor: Richard E. Rudin, Kenosha, Wis.

[73] Assignee: S. C. Johnson & Son, Inc., Racine, Wis.

[21] Appl. No.: 540,383

[22] Filed: Jun. 15, 1990

Related U.S. Application Data

[60] Continuation of Ser. No. 94,062, Sep. 2, 1987, abandoned, which is a continuation of Ser. No. 792,701, Dec. 12, 1985, abandoned, which is a division of Ser. No. 677,335, Dec. 4, 1984, Pat. No. 4,575,395, which is a continuation of Ser. No. 464,179, Feb. 7, 1983, abandoned.

[51] Int. Cl.$^5$ .................... C08B 31/00; C08B 30/14
[52] U.S. Cl. ..................................... 127/71; 127/32; 127/33; 426/96; 426/654; 426/661; 426/579; 536/102; 427/212; 427/213
[58] Field of Search .................... 127/71, 70, 67, 32, 127/33; 426/96, 654, 661, 579; 536/102; 427/212, 213

[56] References Cited

U.S. PATENT DOCUMENTS

| | | | |
|---|---|---|---|
| 2,045,019 | 6/1936 | Lorenzen . | |
| 2,554,143 | 5/1951 | Hinz et al. | 99/139 |
| 2,613,150 | 10/1952 | Halden | 426/579 |
| 2,749,244 | 6/1956 | Winner | 426/661 |
| 2,913,342 | 11/1959 | Cameron et al. . | |
| 3,042,526 | 7/1962 | Spiess, Jr. et al. | 426/285 |
| 3,056,683 | 10/1962 | Cyr | 99/207 |
| 3,291,614 | 12/1966 | Tumerman et al. | 426/99 |
| 3,295,986 | 1/1967 | Saslaw et al. . | |
| 3,332,795 | 7/1967 | Black et al. | 106/210 |
| 3,443,990 | 5/1969 | Decnop | 127/33 |
| 3,553,313 | 1/1971 | Tort | 424/33 |
| 3,560,218 | 2/1971 | Whelan | 99/26 |
| 3,582,350 | 1/1971 | Werbin et al. | 99/94 |
| 3,893,842 | 7/1975 | Glabe et al. | 426/661 |
| 3,955,009 | 5/1976 | Eskritt et al. | 426/578 |
| 4,023,978 | 5/1977 | Messina | 106/213 |
| 4,156,020 | 5/1979 | Bohrmann et al. | 426/96 |
| 4,215,152 | 7/1980 | O'Rourke | 426/661 |
| 4,219,580 | 8/1980 | Torres | 426/549 |
| 4,229,488 | 10/1980 | Suggs et al. | 426/654 |
| 4,260,642 | 4/1981 | Mitchell et al. | 127/71 |
| 4,310,556 | 1/1982 | Suggs et al. | 426/96 |
| 4,310,557 | 1/1982 | Suggs et al. | 426/96 |
| 4,321,263 | 3/1982 | Powell et al. | 424/195 |
| 4,361,592 | 11/1982 | Carpenter et al. . | |
| 4,459,280 | 7/1984 | Colliopoulos et al. | 424/35 |
| 4,548,806 | 10/1985 | Colliopoulos et al. | 424/35 |
| 4,551,331 | 11/1985 | Rudin | 424/195.1 |
| 4,575,395 | 3/1986 | Rudin | 127/32 |
| 4,624,853 | 11/1986 | Rudin | 426/61 |

FOREIGN PATENT DOCUMENTS

| | | | |
|---|---|---|---|
| 11479 | 5/1980 | European Pat. Off. . | |
| 704718 | 4/1941 | Fed. Rep. of Germany . | |
| 1567354 | 9/1965 | Fed. Rep. of Germany . | |
| 765885 | 1/1957 | United Kingdom | 426/96 |
| 971665 | 9/1964 | United Kingdom . | |
| 980158 | 1/1965 | United Kingdom . | |
| 1426106 | 2/1976 | United Kingdom . | |

OTHER PUBLICATIONS

"The Wuster Process for Tablets, Granules, Crystals & Powders", 3 pages From Coating Place, Inc.
"Durkee Durkote®", SCM Corporation, 1981, 2 pages.
Information on Littleford Company's Mixer/-Granulator—Fluidized Bed, 2 pages and "Fluidized Red Mixing of Dry Liquid Dispersions", 3 page Reprint from Aug. 1981 Rubberworld.
Food Emulsifiers, Coatings and Lubricants, Publication No. ZM-1E, Jan. 1987, Eastman Chemical Products, Inc., 16 page.
"Influence of Monoglycerides on the Gelatinization and Enzymatic Breakdown of Wheat and Cassava Starch", Lonkhuysen et al.
Die Starke, 28, No. 7, pp. 227-233 (1976).
Remington's Pharmaceutical Sciences, pp. 1599, 1601 (1985).
Intl. Dictionary of Medicine and Biology, J. Wiley, vol. III, pp. 3009-3010 (1986).
Stedman's Medical Dictionary, 24th ed., Williams Wilkins, p. 1489 (1982).

Primary Examiner—Chung K. Pak

[57] ABSTRACT

A modified pregelatinized starch which is readily dispersible in water comprising a pregelatinized starch coated with from 0.05 to 20% by weight of a food grade emulsifier. A process for producing a coated pregelatinized starch comprising blending a pregelatinized starch with a mixture of a non-toxic solvent and a food grade emulsifier followed by removing the solvent.

17 Claims, No Drawings

COATED PREGELATINIZED STARCH AND PROCESS FOR PRODUCING SAME

This is a continuation of co-pending application Ser. No. 094,062, filed on Sept. 2, 1987, now abandoned, which was a continuation of U.S. Ser. No. 792,701, filed on Dec. 12, 1985, and now abandoned, which was a division of U.S. Ser. No. 677,335, filed on Dec. 4, 1984, and now U.S. Pat. No. 4,575,395, which was a continuation of U.S. Ser. No. 464,179, filed on Feb. 7, 1983, and now abandoned.

BACKGROUND

This invention relates to a modified pregelatinized starch and processes for producing the same. More particularly, this invention relates to a modified starch which is coated by a small percentage of food-grade emulsifier.

Pregelatinized starches have been used for a long time in the food industry. Advantages of using pregelatinized starches include the ability of the starch to thicken or gel promptly without the application of a substantial amount of heat necessary with normal starches. However, this ability to rapidly thicken or gel creates problems when these materials are used in dry products to be reconstituted in small portions by the ultimate consumer. Prior to the development of this invention, if pregelatinized starches were incorporated in substantial amounts in ready mix type consumer products, the directions for mixing the dry product with a liquid, such as milk, water, etc., indicated that a mixing method which provided a substantial amount of shear mixing, such as with an electric or hand beater, etc. be used. The reason for this is the pregelatinized starch swells upon contact with moisture and lumping or agglomeration of the starch occurs on contact with a liquid thereby creating a non-smooth non-homogeneous product unless substantial mixing energy is used.

BRIEF DESCRIPTION AND OBJECTS OF THE INVENTION

It has been therefore surprisingly found that a coated pregelatinized starch can be produced which is readily dispersible in a liquid media without agglomeration by coating a pregelatinized starch with a small percentage of a food grade emulsifier. The process for preparing this material comprises mixing the pregelatinized starch with the emulsifier and with a non-toxic solvent, followed by removing the solvent.

It is therefore the primary object of the present invention to provide a modified pregelatinized starch.

It is a further object of the present invention to provide a pregelatinized starch which is readily dispersible in a liquid media.

It is a still further object of the present invention to provide a process for preparing a modified pregelatinized starch which allows the starch to be readily mixed in a liquid media without agglomeration.

It is a still further object of the present invention to provide a coated pregelatinized starch having a coating of a food grade emulsifier.

Still further objects of the present invention will become more apparent from the following more detailed description thereof.

DETAILED DESCRIPTION OF THE INVENTION

The present invention relates primarily to a modified starch comprising from about 80.0 to 99.95% by weight of a pregelatinized starch selected from a group consisting of tapioca, corn, wheat, potato, rye and mixtures thereof and from about 0.05 to 20% by weight of a food grade emulsifier selected from the group consisting of a mixture of distilled propylene glycol monoesters, distilled monoglycerides, and sodium stearoyl lactylate, hydrophilic ethoxylated sorbitan monoesters, dextrose, malto dextran, lecithin, sucrose, monoglycerides, diglycerides, and mixtures thereof; wherein the emulsifier substantially coats the starch to prevent agglomeration when added to liquids.

The present invention also relates to a process for preparing the above starches. One embodiment of this process comprises of mixing a pregelatinized starch selected from the group consisting of tapioca, corn, wheat, potato, rye and mixtures thereof, from about 0.05 to 20% by weight of an emulsifier, and about 0.5 to 40% by weight of a non-toxic solvent; and removing the solvent to form a dry, free-flowing product.

The present invention relates to a modified pregelatinized starch and a method of modifying pregelatinized starch. Pregelatinized starches are well-known in the food industry for such products as puddings, instant gravy mixes, instant salad dressing mixes, cake mixes and other foods where starch thickening is desired. However, these products suffer from the problem that when added to a liquid such as milk or water, etc. gelation or agglomeration is too quick. This causes the resulting liquid products to be lumpy and to lack desirable smoothness if sufficient mechanical agitation is not used.

In the present invention any of a series of commercially available pregelatinized starches can be utilized. Examples of commercially-available pregelatinized starches include the following starches available from National Starch and Chemical Company, Bridgeport, New Jersey, PO-8, H50, Instant Pure Flo F, Instant Clear Jel, National 1551, Instant Jel, 1F131 and other similar starches available from National Starch. Similar starches also are available from the A. E. Staley Company under the names Starco 477, Instant Tender Jel 434, Instant Tender Jel C., Redisol 88, Redisol 313 F4-469, Starco 401 and the like. .Also starches are available from Henkel Corporation under the names Aytex, Paygel 290, etc. Starches are available from Avebe under the names Prejel 200, Paselli PAC, Paselli P, etc., and are available from the Hubinger Company, under the name Prejel Instant Keogel 30. Preferred starches for use in the process of the present invention include F-447/A. E. Staley Co. or PO-8/National Starch.

The pregelatinized starch makes up the bulk of the composition of the present invention, i.e., from 80.0 to 99.95% by weight of the final coated, pregelatinized starch product. It is preferred that the starch comprise from about 99.00 to 99.95% by weight of the final product and optimally from about 99.50 to 99.92% by weight.

The composition to the present invention also includes from about 0.05 to 20% by weight of a food grade emulsifier. Suitable emulsifiers include Myvatex Texture Lite Emulsifier available from Eastman Kodak, Health and Nutrition Division, Kingsport, Tennessee. This material is a mixture of distilled propylene glycol monoglycerides, distilled monoglycerides and sodium stearoyl lactylate. Other emulsifiers also can be used including a hydrophilic ethoxylated sorbitan monoesters, such as the Tweens available from ICI America especially Tween 60, Sorbitan monostearate plus 20 Moles EO, and Tween 80, Sorbitan monoleate plus 20 moles EO, dextrose, malto dextran, lecithin, sucrose, monoglycerides, diglycerides, and mixtures thereof. The preferred emulsifier is the Myvatex Texture Lite emulsifier. The emulsifier should be present in the composition in the amount of about 0.05 to 20% by weight. It is preferred that from about 0.05 to 1.0% by weight emulsifier be used and optimally from about 0.08 to 0.50% by weight should be used.

It is surprising that coating the pregelatinized starch with such a small quantity of an emulsifier retards the initial gelatinization of the starch when contacted with moisture so that a lump-free and smooth product is produced. Furthermore, it is surprising that, although initial gelatinization is retarded, the coating is sufficiently thin such that upon mixing by shaking or other minimal agitation, the starch can be completely dispersed throughout the liquid medium to thicken the product.

One method for producing the modified starches of the present invention is by mixing pregelatinized starch with the emulsifier in the presence of a non-toxic solvent. The starch should be mixed with from 0.05 to 20% of an emulsifier or sugar and from 0.5 to 40% by weight of the solvent. Suitable solvents include ethanol, mixtures of water and ethanol, mixtures of water, ethanol and ethyl acetate whereby the ethyl acetate is present in small quantities such as a denatured ethyl alcohol. The solvent, emulsifier and starch is then mixed so that the emulsifier coats the starch particles. This mixing can take place using a number of different mixing processes such that intimate contact between the emulsifier and the starch is achieved. Examples of such processes include the Wurster Process which is a modified fluidized bed coating system which produces encapsulated products. A second process is the Durkee encapsulation process which essentially is an air suspension coating process, i.e., the fluidized bed is supported with air and sprayed with the coating material. A last mixing process includes the use of a Littleford blender of the type as described in the August 1981 RUBBER WORLD article entitled "Fluidized Bed Mixing of Dry Liquid Dispersions". After the solvent, emulsifier and starch are mixed together the solvent is then flashed off using conventional means to form the dry powdered coated product. Still another method is blending the emulsifier with the starch in the Littleford/Logie Blender without any solvent. Heat may be applied to the mixture to speed up the coating process but it is not essential.

The composition of the present invention will now be illustrated by way of the following examples which are in the purposes of illustration and are not in any way to be considered as limiting. In the following, all parts and percentages are by weight and all temperatures are in degrees celsius.

EXAMPLE 1

A pregelatinized tapioca starch F-447 available from A. E. Staley Co. was placed into the bin of a Wurster Process apparatus. The coating of formulation was formed from a combination of 87.0% ethyl alcohol and 13% Myvatex Texture Lite emulsifier available from Eastman Kodak. This emulsifier is a mixture of distilled propylene glycol monoglycerides, distilled monoglycerides, and sodium stearoyl lactylate. The temperature was 60° C. and the application time was 10 minutes. The pump speed was set at 8.8 RPMs and the air duct at 0.1 cubic feet per minute. The atomized air was set at 40 PSIG and the atomized air volume was 9.3 cubic feet per minute. This produced a final product having a coating level of 0.1% emulsifier on the F-447 starch.

When this material was added to liquid, it easily dispersed with simple mixing.

EXAMPLE 2

The process of Example I was repeated with the exception that the pump speed was changed to 12.1. This produced a coated starch having a coating level of 0.15% emulsifier.

EXAMPLE 3

The procedure of Example I was repeated with the exception that the pump speed was raised to 16.6 RPM. This produced a starch having a coating level of 0.2% emulsifier.

EXAMPLE 4

The procedure of Example I was repeated with the exception that the application time was 20 minutes, the temperature was 37.8° C., the pump speed was 12.8 RPM, the air duct was 0.07 cubic feet per minute, and the atomizer air volume was 8.6 cubic feet per second. This process produced a starch having a 0.30% emulsifier coating.

EXAMPLE 5

A series of runs using various coating mixtures were run using the Wurster Process described in Example I. In each of these runs, different coating formulations were utilized. In each case the starch coated was A. E. Staley F-447 pregelatinized tapioca starch. Also the settings in the Wurster Process were varied to produce a variety of starch coating levels. In each case, the coated starch was readily dispersable when mixed with water.

TABLE I

| | Coating Formulations | | | | | |
|---|---|---|---|---|---|---|
| | A | B | C | D | E | F |
| Texture Lite[1] | 6.51 | — | 1.0 | 0.5 | 2.0 | — |
| Polysorbate 60 | — | 13.0 | — | — | — | — |
| Sugar | — | — | — | — | — | 47.0 |
| Ethyl Alcohol | 93.49 | 87.0 | 13.0 | 6.5 | 13.0 | — |
| Water | — | — | 86.0 | 93.0 | 85.0 | 53.0 |

[1]See Example I

TABLE II

| | | | Process Variables | | | | | |
|---|---|---|---|---|---|---|---|---|
| Run | Temp. C. | Coating | Pump Speed RPM | Air Duct CFM | Atomize Air PSIG | Atomize Air Vol. CFM | Coating Level | Appln. Time Minutes |
| i | 37.8 | A | 12.8 | 0.1 | 40 | 8.5 | 0.15 | 5 |
| ii | 60 | A | 25.6 | 0.12 | 40 | 8.4 | 0.30 | 20 |

TABLE II-continued

| Run | Temp. C. | Coating | Process Variables | | | | | Coating Level | Appln. Time Minutes |
| --- | --- | --- | --- | --- | --- | --- | --- | --- | --- |
| | | | Pump Speed RPM | Air Duct CFM | Atomize Air PSIG | Atomize Air Vol. CFM | | | |
| iii | 60 | B | 6.4 | 0.1 | 40 | 8.3 | | 0.30 | 20 |
| iv | 37.8 | B | 51.6 | 0.1 | 40 | 8.3 | | 0.30 | 5 |
| v | 82.2 | C | 37.3 | 0.3 | 80 | 12.6 | | 0.15 | 5 |
| vi | 70 | C | 18.6 | 0.25 | 80 | 11.3 | | 0.30 | 20 |
| vii | 37.8 | D | 37.2 | 0.13 | 60 | 9.3 | | 0.30 | 20 |
| viii | 60 | E | 9.3 | 0.25 | 80 | 12.4 | | 0.6 | 20 |
| ix | 60 | F | 5.0 | 0.25 | 80 | 12.3 | | 1.0 | 4 |
| x | 60 | F | 5.0 | 0.25 | 80 | 12.3 | | 7.9 | 26 |

EXAMPLE 6

A procedure similar to that in Example I was utilized with the exception that Myvatex Texture Lite emulsifier was sprinkled directly on top of the starch using the Wurster Process without any solvent. In this example, the application time was 10 minutes, the temperature was 71.1° C., the air duct volume was 0.05 cubic feet per minute, the atomizer air pressure was 40 PSIG, the atomizer air volume was 9.3 cubic feet per minute, and the coating level was 0.15%. The starch to be coated was F-447 from A. E. Staley Co., the same starch used in Example I. This material was readily dispersible when added to water with simple mixing.

EXAMPLE 7

The procedure of Example II is repeated with the exception that the starch used was PO-8, a tapioca starch available from National Starch Chemical Co., New Jersey. This material produced the coated material. The starch had a coating of 0.15% emulsifier and was readily dispersible when added to water.

EXAMPLE 8

A procedure similar to that set forth in Example I was used except that the application time was 11 minutes, the temperature was 60° C., the pump setting was 25 RPM, the air duct was 0.1 cubic feet per minute, the atomizer air pressure was 40 PSIG, the atomizer air volume was 8.6 cubic feet per minute and the material to be coated was flour. The produced a coated flour having a coating level of 0.3% and was somewhat dispersible in water. The flour did not agglomerate or lump when the powder was added to water.

EXAMPLE 9

F-447 starch from A. E. Staley Co. was placed into a Littleford blender. Coating composition comprising 6.51% Texture Lite and 93.49% ethyl alcohol was sprayed onto the starch while the blender was in operation. This mixture was then allowed to blend until uniform. A light vacuum was then pulled on the blender to evacuate the alcohol leaving the starch dry and free flowing. This produced a material which was readily dispersible when added to water.

EXAMPLE 10

The procedure of Example 9 was repeated with the exception that the starch and the dry emulsifier were mixed together in the blender. The batch was force heated to 61.1 degrees centigrade and agitated for 40 minutes. This was then followed by force cooling to 41.7° C. and agitated for an additional 30 minutes. This produced a coated starch having 0.15% emulsifier coating which was readily dispersible when added to water.

What I claim is:

1. A process for producing a modified, dry, free-flowing pregelatinized starch product which is dispersible in aqueous liquids without agglomeration which process comprises
   (a) mixing to form a coated product, ingredients consisting essentially of 99 to 99.95% of a pregelatinized starch selected from the group consisting of tapioca, corn, wheat, potato, rye and mixtures thereof, from about 0.05 to 1% by weight of an emulsifier, and from about 0.5 to 40% by weight of a non-toxic solvent based on the weight of the starch and emulsifier wherein the mixing is performed by suspending the starch so that the emulsifier and solvent is placed in intimate contact with the starch and substantially coats and substantially encapsulates the starch; and
   (b) removing the solvent to recover the modified pregelatinized starch which is in the form of a dry free-flowing product having a thin coating of the emulsifier which prevents agglomeration when the substantially encapsulated product is added to an aqueous liquid media and such that upon minimal agitation, the starch is dispersed throughout the aqueous liquid media to which it is added and thickens said media.

2. The process of claim 1 wherein the emulsifier is a mixture of distilled propylene glycol monoesters, distilled monoglycerides and sodium stearoyl lactylate.

3. The process of claim 1 wherein the solvent is selected from the group consisting of ethyl alcohol, water and mixtures of ethanol and ethyl acetate, and mixtures thereof.

4. The process of claim 1 wherein the emulsifier is selected from the group consisting of a mixture of distilled propylene glycol monoesters, distilled monoglycerides and sodium stearoyl lactylate, hydrophilic ethoxylate sorbitan monoesters, dextrose, malto dextran, lecithin, sucrose, monoglycerides, diglycerides and mixtures thereof.

5. The process as claimed in claim 1 wherein said mixing is accomplished using a fluidized bed coating process.

6. The process as claimed in claim 1 wherein said mixing is accomplished using an air suspension coating process.

7. A process for producing a modified, dry, free-flowing pregelatinized starch product which is dispersible in aqueous liquids without agglomeration which process comprises
   (a) mixing from about 99 to 99.95% by weight of a pregelatinized starch selected from the group consisting of tapioca starch, corn starch, wheat starch, potato starch, rye starch, and mixtures thereof and from about 0.05% to 1% by weight of a food grade emulsifier selected form the group consisting of a mixture of distilled propylene glycol monoesters, distilled monoglycerides and sodium stearoyl lactylate, hydrophilic ethoxylated sorbitan monoesters, dextrose, malto dextran, lecithin, sucrose, monoglycerides, diglycerides and mixtures thereof, and from 0.5 to 40% by weight of a non-toxic solvent based on the weight of the starch and emulsifier, wherein the mixing is performed by suspending the starch such that and until the emulsifier and solvent substantially coats and substantially encapsulates the starch; and (b) removing the solvent to recover the modified pregelatinized starch in the form of a dry free-flowing product having a thin coating of the emulsifier which prevents agglomeration when the substantially encapsulated product is added to an aqueous liquid media and such that upon minimal agitation, the starch is dispersed throughout the aqueous liquid media to which it is added and thickens said media.

8. The process of claim 7 wherein the pregelatinized starch is present in an amount of from 99 to 99.95% by weight.

9. The process of claim 7 wherein the emulsifier is a mixture of distilled propylene glycol monoesters, distilled monoglycerides and sodium stearoyl lactylate.

10. The process of claim 7 wherein the solvent is selected from the group consisting of ethyl alcohol, water, and mixtures of ethanol and ethyl acetate, and mixtures thereof.

11. The process of claim 8 wherein the solvent is selected from the group consisting of ethyl alcohol, water, and mixtures of ethanol and ethyl acetate, and mixtures thereof.

12. The process of claim 11 wherein the emulsifier is a mixture of distilled propylene glycol monoesters, distilled monoglycerides and sodium stearoyl lactylate.

13. The process as claimed in claim 7 wherein said mixing is accomplished using a fluidized bed coating process.

14. The process as claimed in claim 7 wherein said mixing is accomplished using an air suspension coating process.

15. A process for producing a coated, dry, free-flowing pregelatinized starch product which is dispersible in aqueous liquids without agglomeration which process comprises blending to form a coated product, ingredients consisting essentially of 99 to 99.95% by weight of a pregelatinized starch selected from the group consisting of tapioca, corn, wheat, potato, rye and mixtures thereof, and from 0.05 to 1% by weight of an emulsifier comprising a mixture of distilled propylene glycol monoesters, distilled monoglycerides and sodium stearoyl lactylate wherein the blending is performed by suspending the starch so that the emulsifier is placed in intimate contact with the starch and substantially coats and substantially encapsulates the starch to form a coated pregelatinized starch in the form of a dry free-flowing product having a thin coating of the emulsifier which prevents agglomeration when the substantially encapsulated product is added to an aqueous liquid media and such that upon minimal agitation, the starch is dispersed throughout the aqueous liquid media to which it is added and thickens said media.

16. The process as claimed in claim 15 wherein said blending is accomplished using a fluidized bed coating process.

17. The process as claimed in claim 15 wherein said blending is accomplished using an air suspension coating process.

* * * * *